United States Patent [19]

Miura

[11] Patent Number: 5,283,004
[45] Date of Patent: Feb. 1, 1994

[54] METHOD FOR THE PREPARATION OF A SILICONE DEFOAMER COMPOSITION

[75] Inventor: Takahiro Miura, Kanagawa, Japan

[73] Assignee: Dow Corning Corporation, Midland, Mich.

[21] Appl. No.: 310,158

[22] Filed: Feb. 10, 1989

Related U.S. Application Data

[63] Continuation-in-part of Ser. No. 69,089, Jul. 2, 1987, abandoned.

[30] Foreign Application Priority Data

Jul. 18, 1986 [JP] Japan ................................ 61-167840
Feb. 24, 1987 [JP] Japan .................................. 61-39041

[51] Int. Cl.$^5$ ............................................. B01D 19/04
[52] U.S. Cl. ...................................... 252/358; 252/321; 524/588; 524/501; 524/863
[58] Field of Search ..................... 524/501, 588, 863; 252/321, 358; 528/25, 29, 33, 34

[56] References Cited

U.S. PATENT DOCUMENTS

| | | | |
|---|---|---|---|
| 3,455,839 | 7/1969 | Rauner | 252/321 |
| 3,560,401 | 2/1971 | O'Hara et al. | 252/358 |
| 4,101,499 | 7/1978 | Herzig | 524/863 |
| 4,145,308 | 3/1979 | Simonecu et al. | 252/321 |
| 4,443,359 | 4/1984 | Shimizu et al. | 252/358 |
| 4,486,336 | 12/1984 | Pape et al. | 252/321 |
| 4,554,187 | 11/1985 | Grape et al. | 524/588 |
| 4,597,894 | 7/1986 | Abe et al. | 252/321 |
| 4,626,377 | 12/1986 | Kavchok et al. | 252/321 |
| 4,639,489 | 1/1987 | Aizawa et al. | 524/588 |
| 4,690,713 | 9/1987 | Tarae et al. | 252/358 |
| 4,749,740 | 6/1988 | Aizawa et al. | 524/588 |

*Primary Examiner*—Ralph H. Dean
*Attorney, Agent, or Firm*—George A. Grindahl; Robert L. McKellar

[57] ABSTRACT

A defoamer composition is obtained when a mixture of certain siloxane-containing components, a finely divided filler, a reaction catalyst and at least one compound having in each molecule at least 1 group expressed by —COR$^5$, —COOR$^6$ or —(OR$^7$)$_n$— is heated. R$^5$ and R$^6$ are the hydrogen atom or saturated or unsaturated monovalent hydrocarbon groups, R$^7$ is a divalent hydrocarbon group having two to six carbon atoms, and the average value of n is at least 1. The siloxane-containing components comprise resinous polyorganosiloxanes and typically, polydiorganosiloxanes. The heated mixture is useful for defoaming anionic systems.

12 Claims, No Drawings ature of from about 50° C. to 300° C., a mixture comprising

METHOD FOR THE PREPARATION OF A SILICONE DEFOAMER COMPOSITION

This is a continuation-in-part of copending application Ser. No. 069,089 filed on Jul. 2, 1987, now abandoned.

BACKGROUND OF THE INVENTION

The invention relates to a method for the preparation of a silicone defoamer composition. To a substantial degree, the foaming of liquids is a serious problem in various industrial methods as generally encompassed by those treatment processes which use a liquid as the treatment agent and those processes in which a liquid is itself subjected to treatment. Foaming of the liquid may reduce the efficiency of an essential treatment process, and product quality may also be compromised.

As is known, the problem of foaming may be addressed by the application of a defoamer having a foam-breaking effect, which serves to extinguish the foam, and/or having a foam-inhibiting effect, which serves to prevent or reduce the foaming tendencies of the liquid. In particular, silicone defoamers are preferred because they are chemically stable, rarely adversely affect the object of application, and have a relatively high defoaming activity even at very low doses.

Various silicone defoamers have been proposed in the art. For example, Japanese Patent Publication Number 45-23613 (23,613/70) describes a defoamer composed of dimethylpolysiloxane oil, a particular siloxane resin, and silica aerogel. Japanese Patent Publication Number 47-1602 (1,602/72) describes a defoamer produced by heating polyorganosiloxane with a finely divided additive such as silica, etc., in the presence of alkali.

However, problems are encountered with the defoaming activity of the prior silicone defoamers described above, particularly due to the brief duration of their foam-inhibiting effect. As a consequence, the requirements of any process which requires long-term foam suppression cannot be met in an entirely satisfactory manner.

BRIEF SUMMARY OF THE INVENTION

The present invention was developed based on the aforementioned circumstances, and the object of the present invention is to provide a method for the preparation of a silicone defoamer composition which has an excellent and long-term, foam-inhibiting effect. It is also an object of the present invention to provide improved silicon-containing defoamer compositions.

These objects, and others which will occur to one skilled in the silicone defoamer art upon consideration of the following disclosure and appended claims, are obtained by the present invention which, briefly stated, comprises heating to cause a reaction in a mixture of certain siloxane-containing components, a finely divided filler, a reaction catalyst and at least one compound having in each molecule at least 1 group expressed by —COR$^5$, —COOR$^6$ or —(OR$^7$)$_n$—, wherein R$^5$ and R$^6$ are the hydrogen atom or saturated or unsaturated monovalent hydrocarbon groups, R$^7$ is a divalent hydrocarbon group having two to six carbon atoms, and the average value of n is at least 1. The siloxane-containing components comprise resinous polyorganosiloxanes and typically, polydiorganosiloxanes.

DETAILED DESCRIPTION OF THE INVENTION

The present invention relates to a method for the preparation of a silicone defoamer composition, said method comprising: heating, at a temperature of from about 50° C. to 300° C., a mixture comprising (1) 0 to 100 weight parts polyorganosiloxane having a viscosity at 25° C. of from 20 to 100,000 centistokes and the average unit formula R$^1_a$SiO$_{(4-a)/2}$ wherein R$^1$ is a monovalent hydrocarbon or halogenated hydrocarbon group having one to ten carbon atoms, and a has an average value of 1.9 to 2.2; (2) 0 to 100 weight parts polyorganosiloxane having a viscosity at 25° C. of at least 200 centistokes and the average unit formula R$^2_b$(R$^3$O)$_c$SiO$_{(4-b-c)/2}$ wherein R$^2$ is a monovalent hydrocarbon or halogenated hydrocarbon group having one to ten carbon atoms, R$^3$ is the hydrogen atom or a monovalent hydrocarbon group having one to ten carbon atoms, the average value of b+c is 1.9 to 2.2, c is a value sufficient to provide at least one group —OR$^3$ in each molecule, and at least one group —OR$^3$ is present at a molecular terminal, the combined quantity of components (1) and (2) being 100 weight parts; (3) 0.2 to 20 weight parts, per 100 weight parts of the combined quantity of components (1) and (2), of at least one compound selected from the following (i) through (iv): (i) organosilicon compounds with the average formula R$^4_d$SiX$_{4-d}$ wherein R$^4$ is a saturated or unsaturated monovalent hydrocarbon group having one to five carbon atoms, X is a hydrolyzable group, and the average value of d is no more than 1, (ii) the partial hydrolysis condensates of compounds (i), (iii) siloxane resins essentially composed of (CH$_3$)$_3$SiO$_{1/2}$ units and SiO$_2$ units in which the ratio of (CH$_3$)$_3$SiO$_{1/2}$ units to SiO$_2$ units is within the range of 0.4/1 to 1.2/1, and (iv) the condensates of compounds (i) or (ii) with compounds (iii); (4) 0.2 to 30 weight parts, per 100 weight parts of the combined quantity of components (1) and (2), of a finely divided filler; (5) an effective amount of a reaction catalyst; (6) at least 0.2 weight parts, per 100 weight parts of the combined quantity of components (1) and (2), of at least one compound having in each molecule at least 1 group expressed by —COR$^5$, —COOR$^6$ or —(OR$^7$)$_n$— wherein R$^5$ and R$^6$ are the hydrogen atom or saturated or unsaturated monovalent hydrocarbon groups, R$^7$ is a divalent hydrocarbon group having two to six carbon atoms, and the average value of n is at least 1; and, optionally, (7) 0.5 to 100 weight parts, per 100 weight parts of the combined quantity of components (1) and (2), of a polyorganosiloxane having a viscosity at 25° C. of from 5 to 200 centistokes and the average unit formula R$^8_e$(R$^9$O)$_f$SiO$_{(4-e-f)/2}$ wherein R$^8$ is a monovalent hydrocarbon or halogenated hydrocarbon group having one to ten carbon atoms, R$^9$ is the hydrogen atom or a monovalent hydrocarbon group having one to ten carbon atoms, the average value of e+f is 1.9 to 2.2, f has a value sufficient to provide at least two groups —OR$^9$ in each molecule, and at least one group —OR$^9$ is present at a molecular terminal.

In the explanation which follows, the silicone defoamer composition is obtained in the present invention by the thermal reaction of a mixture of at least one of components (1) and (2) with components (3) through (6), or this mixture which additionally contains component (7).

Component (1) is a polyorganosiloxane having the average unit formula $R^1{}_aSiO_{(4-a)/2}$ and having a viscosity at 25° C. of from 20 to 100,000 centistokes.

The organic groups $R^1$ in this polyorganosiloxane may be entirely identical, or may be different, and are to consist of monovalent hydrocarbon and halogenated hydrocarbon groups having one to ten carbon atoms. Concrete examples of such groups are quite familiar in the silicone art, and include alkyl, such as methyl, ethyl, propyl, butyl and octyl; haloalkyl, such as trifluoropropyl; aryl, such as phenyl and 2-phenylethyl; and alkenyl, such as vinyl, etc. Methyl is particularly preferred.

In the above formula for component (1) a has a value within the range of 1.9 to 2.2. This polyorganosiloxane is essentially composed of $R^1{}_2SiO$ units and $R^1{}_3SiO_{1/2}$ units, but may contain other constituent siloxane units, such as $R^1SiO_{3/2}$ and $SiO_{4/2}$, as long as the value of a, which represents the $R^1/Si$ molar ratio, falls within the range specified above. Hydroxyl groups and hydrolyzable groups may be present in residual quantities deriving from the production process, but are preferably substantially absent.

Particularly preferred as this polyorganosiloxane component (1) are trimethylsilyl-terminated polydimethylsiloxanes having viscosities of from 100 to 15,000 centistokes at 25° C.

Component (2) is a polyorganosiloxane having the average unit formula $R^2{}_b(R^3O)_cSiO_{(4-b-c)/2}$ and having a viscosity at 25° C. of at least 200 centistokes, preferably within the range of 200 to several million centistokes.

The organic groups $R^2$ are monovalent hydrocarbon or halogenated hydrocarbon group having one to ten carbon atoms, and are generally and concretely exemplified as for $R^1$ above. $R^3$ is the hydrogen atom or a monovalent hydrocarbon group having one to ten carbon atoms and defined as for $R^2$. At least one group $-OR^3$ is to be present at a terminal of the polyorganosiloxane molecular chain.

The value of $b+c$ in this formula for component (2) is to be within the range of 1.9 to 2.2, and c is to have a value sufficient to provide at least one $-OR^3$ group in each molecule.

Hydroxyl-terminated polydimethylsiloxanes having viscosities of from 500 to 50,000 centistokes at 25° C. are particularly preferred as this polyorganosiloxane component (2).

Component (3) is at least one compound selected from the following compounds (i) to (iv):

(i) Organosilicon compounds having the average formula $R^4{}_dSiX_{4-d}$ wherein the group $R^4$ is a saturated or unsaturated monovalent hydrocarbon group, and X is a hydrolyzable group such as $-OR'$, $-OYOR'$, $-NR'R''$, $-ON=CR'R''$, $-OOCR'$, $-OCR'=CR'R''$, $-ONR'R''$, and $-NR'-CO-R''$ wherein $R'$ and $R''$ are the hydrogen atom or monovalent hydrocarbon groups and the terminals of $R'$ and $R''$ in $-ON=CR'R''$ may be bonded to give

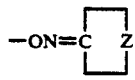

while Y is a divalent hydrocarbon group having one to five carbon atoms. The average value of d is 1 or less, thus indicating $R^4SiX_3$ or $SiX_4$ individually or as their mixture.

These organosilicon compounds are well known in the silicone art, and an exemplary list includes $CH_3Si(OCH_3)_3$, $CH_3Si(OC_2H_5)_3$, $CH_2=CHSi(OCH_3)_3$, $C_6H_5Si(OC_2H_5)_3$, $Si(OC_2H_5)_4$, $Si(OC_3H_7)_4$, $CH_2=CHSi(OC_2H_5)_3$, $Si(OC_2H_4OC_2H_5)_4$, $CH_3Si\{N(C_4H_9)_2\}_3$, $CH_3Si\{ON=C(CH_3)_2\}_3$, $CH_3Si(OOCCH_3)_3$, $CH_3Si\{OC(CH_3)=CH_2\}_3$, $CH_3Si\{ON(C_2H_5)_2\}_3$, etc.

(ii) The partial hydrolysis condensates of the above compounds (i). Methods for producing such condensates are themselves known, any of which may be used to prepare these hydrolysis condensates.

(iii) Siloxane resins essentially composed of $(CH_3)_3SiO_{1/2}$ units and $SiO_2$ units in which the ratio of $(CH_3)_3SiO_{1/2}$ units to $SiO_2$ units is within the range of 0.4/1 to 1.2/1.

These siloxane resins are available commercially, and are produced by the cohydrolysis/condensation of $(CH_3)_3SiCl$ and $SiCl_4$ or by the reaction of $(CH_3)_3SiCl$ with a silicate salt solution. The resulting siloxane resins usually contain approximately 2 to 5 wt % residual hydroxyl groups, and this residual hydroxyl can be reduced to essentially zero by methods which are themselves known. All such siloxane resins are operative within the context of the present invention regardless of their content of residual hydroxyl groups.

(iv) The condensates of siloxane resins comprising compound (iii) with the above compounds (i) or (ii).

Component (4) is a finely divided filler such as silica or fumed $TiO_2$, $Al_2O_3$, or $Al_2O_3/SiO_2$. Fumed $TiO_2$, $Al_2O_3$ and $Al_2O_3/SiO_2$ are produced by known methods by the calcination of $TiCl_4$, and $AlCl_3$ and/or $SiCl_4$, respectively.

Finely divided silica is particularly preferred, and this includes dry-method silicas as produced by the thermal decomposition of silicon halide or by the thermal reaction of silicic acid-containing substances, etc., as well as wet-method silicas as produced by the decomposition by acid of a metal silicate such as sodium silicate, by the aerogel method, etc. Various silicas having particle sizes of several millimicrons to several microns and specific surface areas of about 500 m²/g to 50 m²/g are commercially available and are useful in this invention.

Component (5) is a compound which functions as a catalyst to promote the reaction of the individual components. This compound is preferably a siloxane equilibration or silanol condensation catalyst, and is selected from, for example, alkali metal hydroxides, alkali metal silanolates, alkali metal alkoxides, quaternary ammonium hydroxides and silanolates, quaternary phosphonium hydroxides and silanolates, and the metal salts of organic acids. These compounds are also well known in silicone chemistry, and need not be explained in great detail.

Examples of the alkali metal hydroxides are KOH, CsOH, etc. Their reaction with low molecular-weight silicone or silicate, or the partial hydrolyzate thereof, affords an alkali metal silanolate. When said low molecular-weight silicone or silicate corresponds to a component (3), the obtained alkali metal silanolate qualifies as a component (3). As a consequence, as long as the quantity of addition of said alkali metal silanolate satisfies the quantity requirement for component (3), a separate compound serving as component (3) need not be added.

The alkali metal alkoxides are the products of the reaction of an alkali metal hydroxide as above with an alcohol having one to five carbon atoms.

Quaternary ammonium hydroxides are, for example, betahydroxyethyltrimethylammonium hydroxide, benzyltrimethylammonium hydroxide, tetramethylammonium hydroxide, etc.

Quaternary phosphonium hydroxides are, for example, tetramethylphosphonium hydroxide and tetraethylphosphonium hydroxide.

The metal salts of organic acids include dibutyltin dilaurate, stannous acetate, stannous octanoate, lead naphthenate, zinc octanoate, iron 2-ethylhexanoate, cobalt naphthenate, etc.

Component (6) is selected from compounds containing in each molecule at least one group —$COR^5$, —$COOR^6$ or —$(OR^7)_n$—.

In component (6) $R^5$ and $R^6$ are the hydrogen atom or saturated or unsaturated monovalent hydrocarbon groups, $R^7$ is a divalent hydrocarbon group having two to six carbon atoms, and n has an average value of 1 or more.

The following compounds are listed as exemplary of this component.

(i) Alkylene glycols as expressed by $R'O(CH_2CH_2O)_p\{CH_2CH(CH_3)O\}_qR''$ wherein R' and R'' are hydrogen or monovalent hydrocarbon groups, and p+q has an average value of 1 or more and as concretely exemplified by $HO(CH_2CH(CH_3)O)_qH$, polyoxyethylene-polyoxypropylene copolymers, $HO(CH_2CH_2O)_p\{CH_2CH(CH_3)O\}_qH$, etc.

(ii) Polyhydric alcohols, such as glycerol, sorbitol, etc., and their condensates.

(iii) Carboxylic acids and their metal salts and esters such as propionic acid, caprylic acid, lauric acid, phthalic acid, acrylic acid, etc.; alkali metal salts such as potassium oleate and their esters. Castor oil is also encompassed by this category.

(iv) Nonionic surfactants, for example, sorbitan fatty acid esters, sucrose fatty acid esters, (poly)glycerol fatty acid esters, propylene glycol fatty acid esters, polyoxyethylene fatty acid esters, polyoxyethylene alkylphenyl ethers, polyoxyethylene alkylphenyl formaldehyde and its condensates, polyoxyethylene sorbitan fatty acid esters, polyoxyethylene castor oil, polyoxyethylene maleic acid esters, polyoxyethylene alkylamines, polyoxyethylene fatty acid amides, alkylenediamine-polyoxyalkylene condensates, and others.

(v) Polyoxyethylene anionic surfactants, for example, polyoxyethylene alkyl ether sulfates, alkyl sulfate alkanolamines, polyoxyethylene alkyl ether phosphate esters, and others.

(vi) Polyether-modified silicones which are copolymers of linear or resinous siloxanes with polyoxyalkylene, and, while various substances are included in this category, those with the formula $R'''_3SiO(R'''_2SiO)_r(R'''GSiO)_sSiR'''_3$, are particularly preferred. In the formula the groups R''' may be identical or different, and are monovalent hydrocarbon groups with methyl being particularly preferred. G is a polyoxyalkylene group, and r and s are integers.

(vii) Nonionic fluorinated surfactants, for example, $CF_e(CF_2)_6(OCH_2CH_2)_5OH$, $CF_3(CF_2)_6(OCH_2CH_2)_5OCH_3$, etc.

(viii) OH-containing polymeric compounds, for example, hydroxyethylcellulose, hydroxymethylcellulose, carboxymethylcellulose, gum arabic, xanthan gum, and others.

These compounds are known and are available commercially, and may be used individually or in combinations of two or more.

Component (7) is a polyorganosiloxane having the average unit formula $R^8_e(R^9O)_fSiO_{(4-e-f)/2}$ and having a viscosity at 25° C. of from 5 to 200 centistokes.

In the formula for component (7) $R^8$ is a monovalent hydrocarbon or halogenated hydrocarbon group having one to ten carbon atoms, $R^9$ is the hydrogen atom or a monovalent hydrocarbon group having one to ten carbon atoms, and e+f has a value in the range of 1.9 to 2.2. This polyorganosiloxane is the same as the polyorganosiloxane comprising component (2), with the exceptions that its viscosity at 25° C. is from 5 to 200 centistokes and f has a value sufficient to provide at least two groups —$OR^9$ in each molecule. Particularly preferred polyorganosiloxanes in this regard are hydroxyl-terminated polydimethylsiloxanes having a viscosity of from 10 to 50 centistokes at 25° C.

The silicone defoamer composition of this invention is produced by mixing components comprising one or both of the above components (1) and (2) with components (3) through (6) or components (3) through (7) and heating them sufficiently to cause a reaction thereamong. Alternatively, the components other than component (6) are first mixed and reacted with heating, followed by the addition and reaction of component (6) therewith by continued heating. It is essential that the defoaming composition be prepared, as noted above, before it is dispersed into a diluent such as water or other liquid medium.

In this stage, the quantity of addition of each component is as follows. For components (1) and (2), the quantity of addition is within the ranges of 0 to 100 weight parts for component (1), and 0 to 100 weight parts for component (2), and the combined quantity of components (1) and (2) is 100 weight parts. For component (3) and the subsequent components, the following amounts are given per 100 weight parts of the combined quantity of components (1) plus (2): component (3), 0.2 to 20 weight parts and preferably 1 to 7 weight parts; component (4), 0.2 to 30 weight parts and preferably 1 to 15 weight parts; component (5), a catalytic quantity of the catalytically active component, generally 0.01 to 1 weight part; component (6), 0.2 weight parts and preferably 0.5 weight parts; component (7), 0.5 to 100 weight parts and preferably 1 to 20 weight parts.

The compounding ratio between components (1) and (2) is substantially affected by their respective viscosities, and a high-viscosity (around that of a gum) component (2) should be used in combination with a low-viscosity component (1). The preferred compounding ratio will provide a viscosity at 25° C. within the range of from 350 to 100,000 centistokes for their combination. While there is no upper limit on the proportion of component (6), it is preferably 200 weight parts for economic reasons.

While the prescribed quantities of the above components are to be simply mixed as appropriate, the components other than component (4) should be mixed first, followed by the mixing of component (4) to homogeneity using a dispersion means such as a homomixer, colloid mill, three-roll, etc. This mixture is preferably heated to 100° C. to 300° C. or at or above the melting point of component (6), and reacted for 1 to 24 hours depending on the temperature.

The reaction at this point is a reaction among components (1), (2), (3), (4), and (6), and also component (7) when present. While its details remain unclear, it is certain that a reaction develops upon heating because a defoamer composition cannot be obtained from the unheated mixture of the individual components. This mixing and heating process is preferably conducted under an inert gas from the standpoints of safety and removal of the volatiles, such as for example, unreacted substances, by-products, etc.

The order of mixing, heating temperature, and heating time are not critical or rigorously specified in the execution of the present invention, and can be varied as appropriate.

The silicone defoamer composition produced by means of the present invention may be used as such, or may be dispersed in an appropriate solvent and used as a solution, or may be used as an emulsion by means of the application of the known emulsifying technology. It retains an excellent defoaming activity for long periods of time, and in particular has a superb effect in anionic foaming systems.

The present invention will be explained in the following using illustrative examples, but is not limited to the examples. All viscosities were measured at 25° C.

METHOD FOR TESTING DEFOAMING PROPERTIES

Each composition prepared below was emulsified using the following recipe in order to prepare the 10% emulsions.

| | |
|---|---|
| Defoamer composition | 10.0 weight parts |
| Polyoxyethylene monostearic acid ester | 1.4 weight parts |
| Glycerol fatty acid ester | 1.2 weight parts |
| Hydroxyethylcellulose | 1.5 weight parts |
| Antiseptic | 0.1 weight parts |
| Water | remainder |
| Total | 100.0 weight parts |

The process that was used to prepare the 10% emulsions consisted of heating the water to 70° C. and the remaining ingredients of the above receipe, except the defoamer composition, were added to the hot water and the resulting mixture was agitated at 70° C. for 20 minutes. The defoamer composition was then added to the mixture and the resulting mixture was heated at 70° C. for 20 minutes. This mixture was cooled to room temperature and then passed through a colloid mill to provide the 10% emulsion to be tested. All defoamer compositions of this invention and all comparison defoamer compositions were emulsified in this manner for testing.

Each emulsion was subjected to shaking, under the conditions described below, using a barrel wrist-action shaker for 10 seconds in order to measure the time (t) in seconds from immediately after the termination of shaking to extinction of the large foam, and the time (T) in seconds required for the liquid surface to appear.

After this, t and T were similarly measured after shaking for 40 seconds, and shaking and measurement were repeated in succession for shaking times of 60, 120, 180, and 180 seconds. The results for each example (t/T) are reported in Tables 1 through 7.

SHAKING CONDITIONS

Test container: 200 mL glass bottle
Foaming liquid: 100 mL of a 0.25 wt % aqueous (distilled water) solution of sodium dodecylbenzenesulfonate
Amount of defoamer added: quantity giving 200 ppm of composition or 200 ppm of silicone fraction
Number of shakes: 350 cycles per minute
Test temperature: 25° C.

The results in Tables 1 through 7 make it clear that the method of the invention produces a silicone defoamer composition having an excellent defoaming effect.

Example 1

318 g Trimethylsilyl-terminated polydimethylsiloxane having a viscosity of 1,000 centistokes, 180 g silanol-terminated polydimethylsiloxane having a viscosity of 12,500 centistokes, and 18 g polyethyl silicate (Silicate 45 from Tama Kagaku Kogyo Kabushiki Kaisha) were placed in a 1 L three-neck flask equipped with a stirrer, thermometer, and means for the supply and discharge of nitrogen gas. This was then heated with stirring after the addition of 6 g polyoxyethylene (POE)-polyoxypropylene (POP) copolymer (MW=3,500, POE/POP=10/90, hydroxyl terminated). Upon reaching 130° C. to 140° C., 3 g catalyst was added and heating and stirring were continued. The catalyst was prepared in advance by reacting 90 g trimethylsilyl-terminated polydimethylsiloxane (1,000 centistokes) with 10 g KOH at 120° C. for 15 minutes. 18 g silica (Aerosil #200 from Nippon Aerosil Kabushiki Kaisha, specific surface=200 m$^2$/g) and 30 g silanol-terminated polydimethylsiloxane (40 centistokes) were then added and dispersed to homogeneity using a homomixer. After this, a reaction was conducted by heating with stirring at 180° C. for 4 hours.

The obtained reaction product was heated at 180° C./40 mmHg for 1 hour in order to remove unreacted materials and reaction by-products. Cooling to room temperature afforded a thick, light yellow silicone defoamer composition. The entire process was conducted under a nitrogen gas purge. Test results for this composition are listed in Table 1.

COMPARISON EXAMPLE 1

A comparison composition (Composition A) was prepared by following the procedure of Example 1, with the exceptions that 378 g trimethylsilyl-terminated polydimethylsiloxane was added and no polyoxyethylene-polyoxypropylene copolymer was added. Test results are listed in Table 1.

TABLE 1

| Shaking Time | Example 1 (t/T) | Comparison Example 1 (t/T) |
|---|---|---|
| 10 seconds | 2/2.5 | 3/3.5 |
| 40 seconds | 2/2 | 3/3 |
| 60 seconds | 3/3.5 | 4/5 |
| 120 seconds | 5/5.5 | 7/>120 |
| 180 seconds | 6.5/9.5 | 13/>120 |
| 180 seconds | 9/12.5 | 27/>120 |

EXAMPLES 2-6

500 g Composition A, prepared in Comparison Example 1; Component (6), quantity and type reported in Table 2; and 1.5 g catalyst, as in Example 1, were charged to the same type of reactor as in Example 1. After mixing to homogeneity in a homomixer, the mixture in each case was heated with stirring and a reaction was carried out at 180° C. for 1 hour. Thick, light-yellow silicone defoamer compositions were obtained. The entire process was conducted under a nitrogen gas purge in each case. Test results are listed in Table 2.

COMPARISON EXAMPLE 2

A comparison composition was produced by the procedure of Example 2 with the exception that heating was simply carried out without the addition of catalyst. Test results of this composition are listed in Table 2.

TABLE 2

| POE/POP Copolymer | Example Number | | | | | Comparison Example 2 |
|---|---|---|---|---|---|---|
| | 2 | 3 | 4 | 5 | 6 | |
| MW | 2,000 | 3,500 | 3,500 | 3,500 | 500 | 3,500 |
| POE/POP (%) | 0/100 | 10/90 | 10/90 | 10/90 | 40/60 | 10/90 |
| End groups | OH | OH | OH | OH | OBu/OH | OH |
| Addition* | 3.0 | 1.0 | 50.0 | 100.0 | 1.0 | 50.0 |

| Shaking Time, sec. | Defoaming Performance (t/T) | | | | | |
|---|---|---|---|---|---|---|
| 10 | 5/5 | 2/2 | 3/3 | 3/3.5 | 2/2 | 5/5.5 |
| 40 | 5/5 | 2/2 | 3/2 | 2.5/2.5 | 2/2 | 5.5/6 |
| 60 | 3.5/3.5 | 2/2.5 | 3/3.5 | 3.5/3.5 | 2.5/3 | 7/11 |
| 120 | 2.5/2.5 | 3/4 | 4/5 | 5/6 | 4/4.5 | 10.5/23 |
| 180 | 3.5/3.5 | 5/6 | 5.5/6 | 8/10 | 5.5/8 | 11/82 |
| 180 | 4.5/4.5 | 6/8 | 6/6.5 | 9/11.5 | 7.5/12 | 13/>120 |

*Quantity of addition of POE/POP copolymer is in weight parts per 100 weight parts Composition A.

EXAMPLES 7–11

Following the procedure of Example 2, silicone defoamer compositions according to the invention were prepared using the compounds in Table 3 in place of the POE-POP copolymer. Test results of these compositions are listed in Table 3.

TABLE 3

| Component(6) Name | Example Number | | | | |
|---|---|---|---|---|---|
| | 7 | 8 | 9 | 10 | 11 |
| Sorbitan monostearate | 1.0* | — | — | — | — |
| POE(20)** sorbitan monostearate | — | 1.0* | — | — | — |
| POE(20) monostearate | — | — | 1.0* | — | — |
| POE(60) trimethylnonyl ether | — | — | — | 1.0* | — |
| POE(35) stearyl ether | — | — | — | — | 1.0* |

| Shaking Time, sec. | Defoaming Performance (t/T) | | | | |
|---|---|---|---|---|---|
| 10 | 2.5/3 | 3.5/3.5 | 2/2 | 3/3 | 4/4 |
| 40 | 2/2 | 2.5/2.5 | 2/2 | 2/2 | 3/3 |
| 60 | 3.5/3.5 | 3.5/4 | 2.5/3 | 2.5/3 | 3/3.5 |
| 120 | 4/4.5 | 3.5/4 | 4.5/5 | 3/3 | 3.5/4 |
| 180 | 5.5/6.5 | 3.5/4 | 5.5/9.5 | 4.5/5.5 | 5/5.5 |
| 180 | 6/7.5 | 4/4.5 | 8/18 | 6/9.5 | 6.5/7 |

*Amount of Component (6) added; given in weight parts per 100 weight parts of the composition.
**POE represents the polyoxyethylene moiety, and its degree of polymerization is in parentheses.

EXAMPLES 12–14

Following the procedure of Example 2, silicone defoamer compositions of the invention were prepared using the polyether-modified silicones described in Table 4 in place of the POE-POP copolymer. These polyether-modified silicones have the following formula.

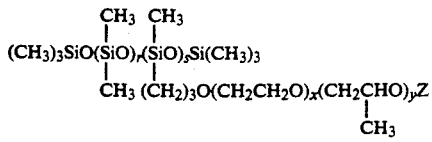

Test results of these compositions are listed in Table 4.

TABLE 4

| Polyether-modified Silicone | Example Number | | |
|---|---|---|---|
| | 12 | 13 | 14 |
| r | 75 | 75 | 75 |
| s | 7 | 7 | 7 |
| x | 13 | 13 | 13 |
| y | 11 | 11 | 11 |
| Z | —H | —H | —COCH$_3$ |
| Addition* | 0.5 | 5.0 | 1.0 |

| Shaking Time, sec. | Defoaming Performance (t/T) | | |
|---|---|---|---|
| 10 seconds | 7/8 | 2.5/2.5 | 7/9 |
| 40 seconds | 7.5/8.5 | 2.5/2.5 | 7/8 |
| 60 seconds | 9/9.5 | 2.5/3 | 8/9 |
| 120 seconds | 10.5/11.5 | 3.5/3 | 11/12 |
| 180 seconds | 12/13.5 | 4/7 | 13/14 |
| 180 seconds | 15.5/16.5 | 6/10 | 15/17 |

*Amount of polyether-modified silicone added; quantity of addition given in weight parts per 100 weight parts Composition A.

EXAMPLES 15–17

Silicone defoamer compositions according to the invention were produced by the procedure of Example 2, but using the hydroxyl-containing polymer compounds specified in Table 5 in place of the POE-POP copolymer. Test results of these compositions are listed in Table 5.

TABLE 5

| | Example Number | | |
|---|---|---|---|
| | 15 | 16 | 17 |
| Component(6) | Hydroxyethylcellulose | Hydroxymethylcellulose | Xanthan gum |
| Addition* | 1.0 | 1.0 | 1.0 |

| Shaking Time, sec. | Defoaming Performance (t/T) | | |
|---|---|---|---|
| 10 | 3/3.5 | 2.5/3 | 5/5.5 |
| 40 | 2.5/3 | 3/3 | 3.5/3 |
| 60 | 3.5/4 | 4/4 | 4/5 |
| 120 | 5/5.5 | 5.5/5.5 | 6/8 |
| 180 | 6/10 | 6.5/10 | 8/16 |

TABLE 5-continued

| 180 | 7.5/17 | 7.5/15.5 | 10/>120 |

*Amount of Component (6) added; quantity of addition given in weight parts per 100 weight parts Composition A.

EXAMPLE 18

348 g trimethylsilyl-terminated polydimethylsiloxane having a viscosity of 1,000 centistokes and 50 g siloxane resin composed of the $(CH_3)_3SiO_{1/2}$ and $SiO_2$ units ($(CH_3)_3SiO_{1/2}$ unit to $SiO_2$ unit ratio within the range of 0.4/1 to 1.2/1) were mixed to homogeneity with stirring in a 1 L beaker. 70 g hydroxyl-terminated polydimethylsiloxane having a viscosity of 40 centistokes and 6 g polyoxyethylenepolyoxypropylene copolymer as in Example 1 were then added. After stirring for several minutes, 3 g catalyst as in Example 1 was added, and heating was begun. After heating to 130° to 140° C., 30 g silica as in Example 1 was dispersed to homogeneity using a homomixer. A reaction was then conducted for 2 hours at 230° C. using the same set up as in Example 1. The obtained reaction product was heated for 1 hour at 180° C./40 mmHg in order to remove volatile unreacted material and reaction by-products. Cooling to room temperature afforded a silicone defoamer composition of the present invention. Test results of this composition are listed in Table 6.

TABLE 6

| Shaking Time | Defoaming Performance t/T |
|---|---|
| 10 seconds | 2/3 |
| 40 seconds | 2/3 |
| 60 seconds | 4/5.5 |
| 120 seconds | 5/7 |
| 180 seconds | 7/10.5 |
| 180 seconds | 12/14 |

EXAMPLES 19-22

Following the procedure of Example 2, silicone defoamer compositions according to the invention were prepared using the compounds in Table 7 in place of the POE-POP copolymer. Test results of these compositions are listed in Table 7.

TABLE 7

| | Example Number | | | |
|---|---|---|---|---|
| | 19 | 20 | 21 | 22 |
| Component(6) | Sorbitol | K+ Oleate | Na+ POE(20) nonylphenyl sulfate | Perfluoro alkyl POE ether* |
| Addition** | 1.0 | 1.0 | 1.0 | 1.0 |
| Shaking Time, sec. | Defoaming Performance (t/T) | | | |
| 10 | 3.0/3.0 | 2.5/2.5 | 3.5/3.0 | 4.5/4.5 |
| 40 | 3.0/3.0 | 3.0/3.0 | 4.0/3.5 | 4.0/3.5 |
| 60 | 3.0/4.0 | 3.0/3.0 | 4.5/5.0 | 3.5/3.5 |
| 120 | 5.0/7.0 | 4.0/4.5 | 8.0/12.0 | 4.0/4.0 |
| 180 | 7.0/18.0 | 7.0/9.0 | 13.0/21.0 | 4.0/4.5 |
| 180 | 9.0/29.0 | 8.0/13.0 | 20.0/29.0 | 5.0/5.5 |

*FLUORAD FC-170C, available from 3M Company.
**Amount of Component (6) added; quantity of addition given in weight parts per 100 weight parts Composition A.

That which is claimed is:

1. A method for the preparation of a silicone defoamer composition, said method comprising: heating, at a temperature of from about 50° C. to 300° C., in the absence of diluents, a mixture comprising (1) 0 to 100 weight parts polyorganosiloxane having a viscosity at 25° C. of from 20 to 100,000 centistokes and the average unit formula $R^1_a SiO_{(4-a)/2}$ wherein $R^1$ is a monovalent hydrocarbon or halogenated hydrocarbon group having one to ten carbon atoms, and a has an average value of 1.9 to 2.2;
   (2) 0 to 100 weight parts polyorganosiloxane having a viscosity at 25° C. of at least 200 centistokes and the average unit formula $R^2_b(R^3O)_c SiO_{(4-b-c)/2}$ wherein $R^2$ is a monovalent hydrocarbon or halogenated hydrocarbon group having one to ten carbon atoms, $R^3$ is the hydrogen atom or a monovalent hydrocarbon group having one to ten carbon atoms, the average value of $b+c$ is 1.9 to 2.2, c is a value sufficient to provide at least one group $-OR^3$ in each molecule, and at least one group $-OR^3$ is present at a molecular terminal, the combined quantity of components (1) and (2) being 100 weight parts;
   (3) 0.2 to 20 weight parts, per 100 weight parts of the combined quantity of components (1) and (2), of at least one compound selected from the following (i) through (iv),
      (i) organosilicon compounds with the formula $R^4_d SiX_{4-d}$ wherein $R^4$ is a saturated or unsaturated monovalent hydrocarbon group having one to five carbon atoms, X is a hydrolyzable group, and the average value of d is no more than 1,
      (ii) the partial hydrolysis condensates of compounds (i),
      (iii) siloxane resins essentially composed of $(CH_3)_3SiO_{1/2}$ units and $SiO_2$ units in which the ratio of $(CH_3)_3SiO_{1/2}$ units to $SiO_2$ units is within the range of 0.4/1 to 1.2/1, and
      (iv) the condensates of compounds (i) or (ii) with compounds (iii);
   (4) 0.2 to 30 weight parts, per 100 weight parts of the combined quantity of components (1) and (2), of a finely divided filler;
   (5) an effective amount of a reaction catalyst; and
   (6) at least 0.2 weight parts, per 100 weight parts of the combined quantity of components (1) and (2), of at least one compound having in each molecule at least 1 group expressed by $=COR^5$, $-COOR^6$ or $-(OR^7)_n-$ wherein $R^5$ and $R^6$ are the hydrogen atom or saturated or unsaturated monovalent hydrocarbon groups, $R^7$ is a divalent hydrocarbon group having two to six carbon atoms, and the average value of n is at least 1; said compound being selected from the group consisting of (i) alkylene glycols, (ii) polyhydric alcohols, (iii) carboxylic acids and their metal salts and esters, (iv) nonionic surfactants, (v) polyoxyethylene anionic surfactants, (vi) polyether-modified silicones which are copolymers of linear or resinous siloxanes with polyoxyalkylene, (vii) nonionic fluorinated surfactants and (viii) OH-containing polymeric compounds.

2. A method according to claim 1 wherein component (1), when present, is a trimethylsilyl-terminated polydimethylsiloxane having a viscosity of from 100 to 15,000 centistokes at 25° C., component (2), when present, is a hydroxyl-terminated polydimethylsiloxane having a viscosity of from 500 to 50,000 centistokes at 25° C. and component (4) is a finely divided silica.

3. A method according to claim 1 wherein the components, other than component (4), are first mixed and reacted by heating, followed by the addition and reaction of component (4).

4. A method according to claim 1 wherein the components, other than component (6), are first mixed and reacted by heating, followed by the addition and reaction of component (6).

5. A method according to claim 1 wherein the mixture of components (1) and (2) has a viscosity at 25° C. of from 350 to 100,000 centistokes for their combination.

6. Method for the preparation of a silicone defoamer composition, said method comprising: heating, at a temperature of from about 50° C. to 300° C., in the absence of diluent a mixture comprising (1) 0 to 100 weight parts polyorganosiloxane having a viscosity at 25° C. of from 20 to 100,000 centistokes and the formula $R^1_a SiO_{(4-a)/2}$ wherein $R^1$ is a monovalent hydrocarbon or halogenated hydrocarbon group having one to ten carbon atoms, and a has an average value of 1.9 to 2.2;

(2) 0 to 100 weight parts polyorganosiloxane having a viscosity at 25° C. of at least 200 centistokes and the formula $R^2_b(R^3O)_c SiO_{(4-b-c)/2}$ wherein $R^2$ is a monovalent hydrocarbon or halogenated hydrocarbon group having one to ten carbon atoms, $R^3$ is the hydrogen atom or a monovalent hydrocarbon group having one to ten carbon atoms, the average value of $b+c$ is 1.9 to 2.2, c is a value sufficient to provide at least one group $-OR^3$ in each molecule, and at least one group $-OR^3$ is present at a molecular terminal, the combined quantity of components (1) and (2) being 100 weight parts;

(3) 0.2 to 20 weight parts, per 100 weight parts of the combined quantity of components (1) and (2), of at least one compound selected from the following (i) through (iv), (i) organosilicon compounds with the formula $R^4_d SiX_{4-d}$ wherein $R^4$ is a saturated or unsaturated monovalent hydrocarbon group having one to five carbon atoms, X is a hydrolyzable group, and the average value of d is no more than 1, (ii) the partial hydrolysis condensates of compounds (i), (iii) siloxane resins essentially composed of $(CH_3)_3SiO_{1/2}$ units and $SiO_2$ units in which the ratio of $(CH_3)_3SiO_{1/2}$ units to $SiO_2$ units is within the range of 0.4/1 to 1.2/1, and (iv) the condensates of compounds (i) or (ii) with compounds (iii);

(4) 0.2 to 30 weight parts, per 100 weight parts of the combined quantity of components (1) and (2), of a finely divided filler;

(5) an effective amount of a reaction catalyst;

(6) at least 0.2 weight parts, per 100 weight parts of the combined quantity of components (1) and (2), of at least one compound having in each molecule at least 1 group expressed by $=COR^5$, $-COOR^6$ or $-(OR^7)_n-$ wherein $R^5$ and $R^6$ are the hydrogen atom or saturated or unsaturated monovalent hydrocarbon groups, $R^7$ is a divalent hydrocarbon group having two to six carbon atoms, and the average value of n is at least one 1, said compound being selected from the group consisting of (i) alkylene glycols, (ii) polyhydric alcohols, (iii) carboxylic acids and their metal salts and esters, (iv) nonionic surfactants, (v) polyoxyethylene anionic surfactants, (vi) polyether-modified silicones which are copolymers of linear or resinous siloxanes with polyoxyalkylene, (vii) nonionic fluorinated surfactants and (viii) OH-containing polymeric compounds; and, (7) 0.5 to 100 weight parts, per 100 weight parts of the combined quantity of components (1) and (2), of a polyorganosiloxane having a viscosity at 25° C. of from 5 to 200 centistokes and the formula $R^8_e(R^9O)_f SiO_{(4-e-f)/2}$ wherein $R^8$ is a monovalent hydrocarbon or halogenated hydrocarbon group having one to ten carbon atoms, $R^9$ is the hydrogen atom or a monovalent hydrocarbon group having one to ten carbon atoms, the average value of $e+f$ is 1.9 to 2.2, f has a value sufficient to provide at least two groups $-OR^9$ in each molecule, and at least one group $-OR^9$ is present at a molecular terminal.

7. A method according to claim 6 wherein component (1), when present, is a trimethylsilyl-terminated polydimethylsiloxane having a viscosity of from 100 to 15,000 centistokes at 25° C., component (2), when present, is a hydroxyl-terminated polydimethylsiloxane having a viscosity of from 500 to 50,000 centistokes at 25° C., component (4) is a finely divided silica and component (7) is a hydroxyl-terminated polydimethylsiloxane having a viscosity of from 10 to 50 centistokes at 25° C.

8. A method according to claim 6 wherein the components, other than component (4), are first mixed and reacted by heating, followed by the addition and reaction of component (4).

9. A method according to claim 6 wherein the components, other than component (6), are first mixed and reacted by heating, followed by the addition and reaction of component (6).

10. A method according to claim 1 wherein the mixture of components (1) and (2) has a viscosity at 25° C. of from 350 to 100,000 centistokes for their combination.

11. A composition produced by the method of claim 1.

12. A composition produced by the method of claim 6.

* * * * *